United States Patent [19]

Seabra

[11] Patent Number: 5,478,122
[45] Date of Patent: Dec. 26, 1995

[54] ROTATABLE CONNECTOR JOINT

[75] Inventor: Helio L. Seabra, Sao Paulo, Brazil

[73] Assignee: Metalurgica Detroit S.A., Diadema, Brazil

[21] Appl. No.: 306,889

[22] Filed: Sep. 16, 1994

[30] Foreign Application Priority Data

Mar. 24, 1994 [BR] Brazil ................................. 9401280

[51] Int. Cl.$^6$ ..................................................... F16L 27/00
[52] U.S. Cl. ...................... 285/281; 285/382.4; 29/512; 29/523
[58] Field of Search ................................ 285/382.4, 272, 285/278, 280, 281, 98; 29/523, 512

[56] References Cited

U.S. PATENT DOCUMENTS

| | | | |
|---|---|---|---|
| 461,311 | 10/1891 | Brown | 285/278 |
| 1,083,742 | 1/1914 | Hutchinson | 285/278 X |
| 1,911,423 | 5/1933 | Biller | 285/278 |
| 2,172,650 | 9/1939 | Couty | 285/278 |
| 2,190,419 | 2/1940 | Evarts | 285/382.4 X |
| 2,543,088 | 2/1951 | Woodling | 285/281 |
| 2,570,406 | 10/1951 | Troshkin et al. | 285/281 |
| 3,414,299 | 12/1968 | Roe | 285/278 X |
| 3,936,079 | 2/1976 | Eckman | 285/98 |
| 4,005,883 | 2/1977 | Guest . | |
| 4,456,287 | 6/1984 | Bisonya | 285/98 |
| 4,685,706 | 8/1987 | Kowal et al. . | |
| 4,687,235 | 8/1987 | Stoll | 285/98 |
| 4,867,484 | 9/1989 | Guest . | |
| 4,905,766 | 3/1990 | Dietz et al. | 285/382.4 X |
| 4,998,755 | 3/1991 | Reeder | 285/281 X |
| 5,141,262 | 8/1992 | Bartholomew | 29/512 X |
| 5,171,045 | 12/1992 | Pasbrig . | |
| 5,230,539 | 7/1993 | Olson . | |

FOREIGN PATENT DOCUMENTS 8502412  5/1985  Brazil .

*Primary Examiner*—Dave W. Arola
*Assistant Examiner*—Hether Chun Shackelford
*Attorney, Agent, or Firm*—Jacobson, Price, Holman & Stern

[57] ABSTRACT

A rotatable connector joint formed by a main joint body having an axial passage and a ring groove, followed by an axial narrowed portion with a bevelled edge, followed by another widened portion, with a supporting wall for a hermetic O-ring used during an insertion of a terminal end of a rotatable joint body into the main joint body. The rotatable joint body includes a supporting wall for the ring, followed by a hexagonal external projection. The rotatable joint body including at its other extremity, a male clamp or a female clamp, with external screw threads or internal screw threads, the latter being equipped with an axial passage and having, at the front extremity, a narrowed portion which, with the insertion of a cylindrical tool with a tapered point, expands the terminal end and accommodates it in the bevelled edge and ring groove of the main joint body, locking the rotatable joint body axially. The invention aims at simplifying and making faster the locking process for a rotatable joint connector, reducing the manufacture and assembly stages, and consequently, its cost.

3 Claims, 2 Drawing Sheets

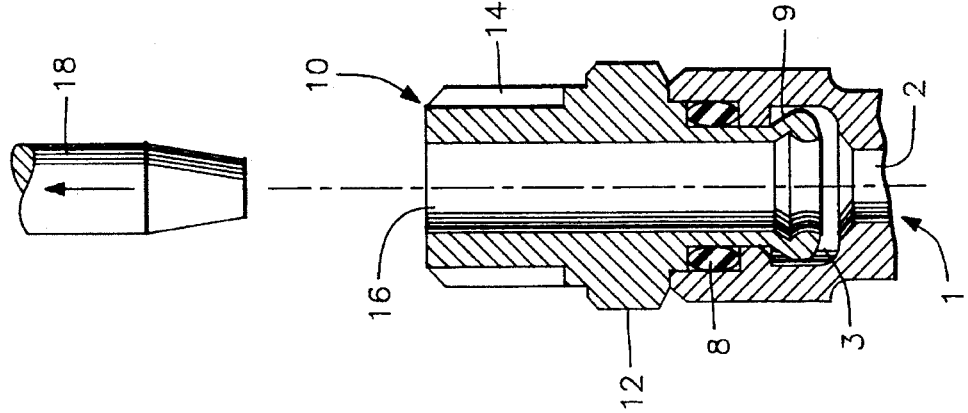
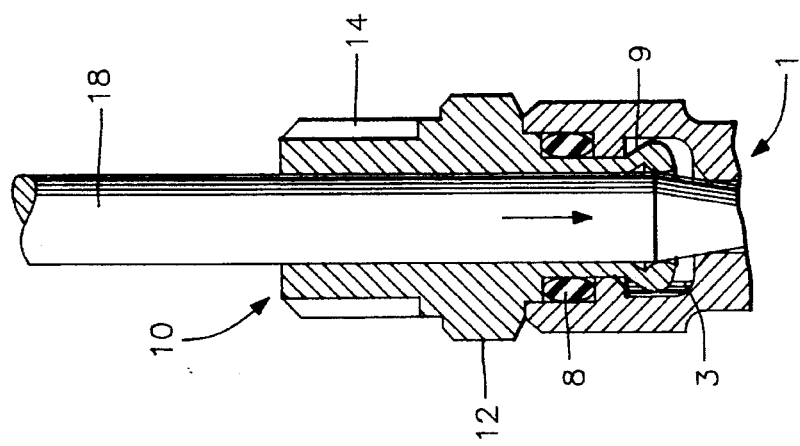
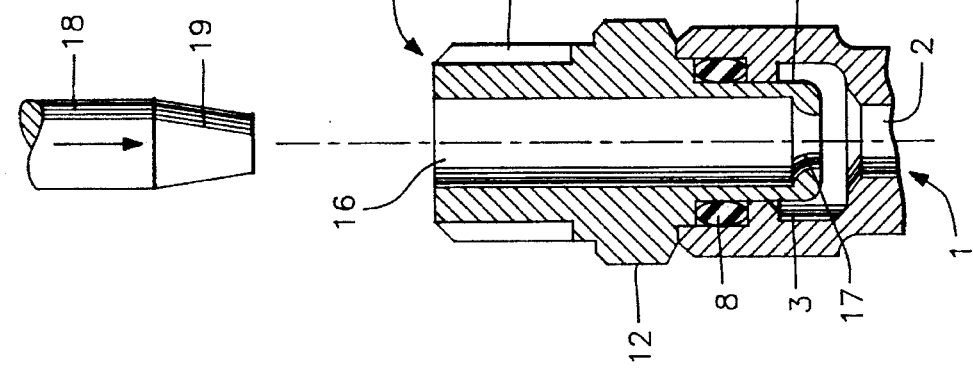
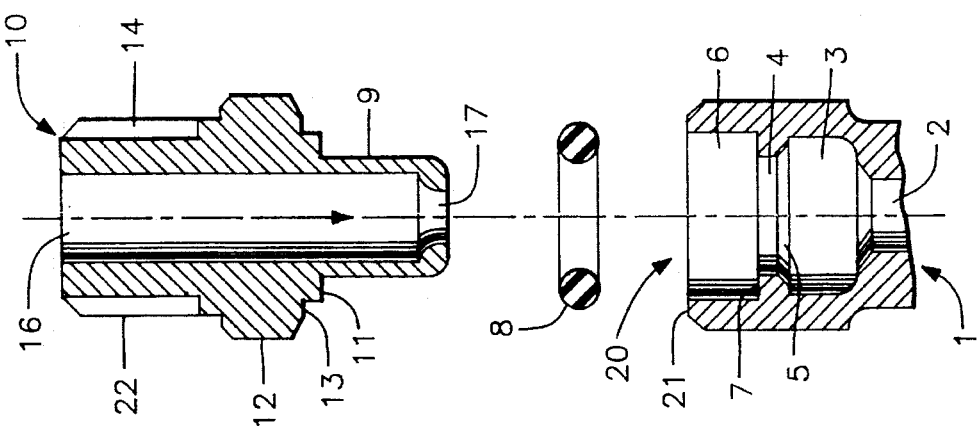

ROTATABLE CONNECTOR JOINT

FIELD OF THE INVENTION

The present invention relates to an improvement in a rotatable joint, whose development aims at simplifying and making faster the locking process of the rotatable joint formed of a main joint body and a rotatable joint body, thus reducing manufacturing stages, the number of components, assembly time, consequently resulting in lower costs.

BACKGROUND OF THE INVENTION

Known joints utilized in fluid ducts, under low or medium pressures, such as hydraulic and pneumatic systems are locked into valves, crank, cylinder or air or oil pumps, etc. and are equipped with rotatable joints with male or female screw threads.

In order to lock a rotating joint body to a main joint body, a ring groove is applied around a projection of the rotating joint body and another groove, this one in the internal face of the main joint body, is locked, by fitting a metallic locking ring.

This manufacturing process, well known and amply utilized, requires two stages of machine-made rings, one externally, around the projection of the rotating joint body and which will be inserted in the main body and, one internally, in the main body, aligned for locking by the mentioned metallic locking ring, the imperviousness between these two parts being assured by an O-ring.

Thus, it is noticeable that a very complex manufacturing process is required, requiring micro-metric precision to guarantee perfect alignment and imperviousness and consequent security, factors that are fundamental if one considers where these joints will be used. This complexity necessarily entails a prolonged manufacturing process, which is expensive and involves many components.

SUMMARY OF THE INVENTION

In the present invention, the improvement applied in the locking process of the rotatable joint, consists of a very simplified manufacture and assembly process, so as to eliminate the need for the manufacture of a ring groove and by eliminating the need for a metallic locking ring, by reducing assembly time, with a perfect adjustment of the locking press, knee type, assuring imperviousness through a hermetic O-Ring and, consequently perfect security. These factors taken into consideration, the above mentioned construction and assembly improvements offer a substantial cost reduction making it very competitive in the marketplace.

This construction mode may be applied to angular joints, ceiling type, and "T" type joints, crosshead Joints, "Y" type joints, etc., with straight and angular exits, etc., used in fluid conductor systems with low or medium pressure.

BRIEF DESCRIPTION OF THE DRAWINGS

In order to better understand the objective of this invention, references will be made to the attached drawings, in which:

FIG. 2 shows, in a vertical cross section, an exploded view of a hermetic O-ring between the male joint body and the main joint body of the rotating connector joint.

FIG. 3 shows, in a vertical cross section, the parts fitted together and the approaching insertion, in the axial orifice of the rotatable joint body, of the cylindrical tool with a tapered point attached to a press to provide expansion to a terminal end of the rotatable joint body.

FIG. 4 shows, in a vertical cross section, the completion of the expansion process at the extremity of the rotating terminal end of the rotatable joint body, through the widening of the internal narrowed ring portion in a direction towards an internal body groove of the main body.

FIG. 5 shows, in a vertical cross section, the tool withdrawal and the effective locking of the rotatable joint body to the main joint body of the rotating connector joint.

DETAILED DESCRIPTION OF THE PREFERRED EMBODIMENTS

Figure 1:
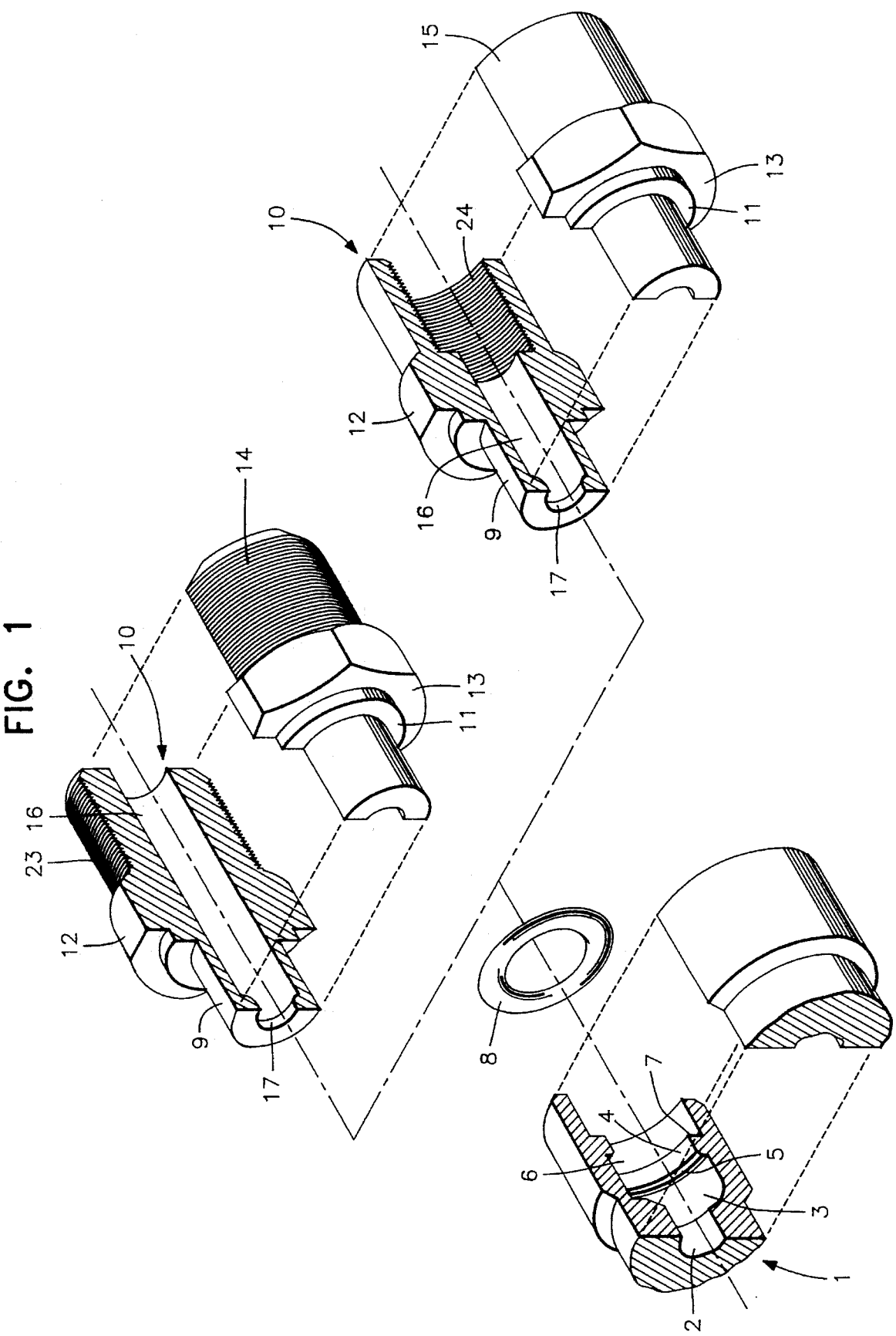
FIG. 1 depicts an exploded upper front view with the components cut longitudinally, showing an internal shape of the components, as well as the construction shape of the rotating joint body with alternative male/female terminal ends.

The present invention is constituted by a main joint body 1 having an axial passage 2 and equipped with a ring groove 3, followed in succeeding order with an axially adjacent radially reduced portion 4 with a bevelled edge 5, followed by another axially adjacent radially widened portion 6, located at a terminal end 20 of the main joint body 1. The widened portion 6 includes a supporting wall 7 for receipt of a hermetic O-ring 8 in a cavity during the insertion of the terminal end 9 of the rotatable joint body 10 into the main joint body 1. The terminal end 9 has a supporting wall 11 also defining part of the cavity for receipt of the ring 8, followed by a hexagonal external projection 12 to facilitate rotation by means of a tool and whose front wall 13 is supported by an edge 21 of the main body 1.

The rotatable joint body 10 presents, at its other terminal end 22, a projection forming a male clamp 14, with external screw threads 23 or a female clamp 15, with internal screw threads 24, the latter being equipped with an axial passage 16. The rotatable joint body, including at its front extremity, a narrow opening 17 which, with the insertion of the cylindrical tool 18 with a tapered point 19, driven by a press (not shown) from above, expands the walls of the narrowed opening 17 and accommodates the outwardly tapered walls of the narrowed opening 17 on the bevelled edge 5. The expanded narrowed opening fits within the ring groove 3 of the main joint body 1 so as to support the rotatable joint body in a cradle within the main joint body with a configuration so as to lock the rotatable joint body 10 axially while allowing free rotation of the rotatable joint body within the main joint body.

I claim:

1. A rotatable connector joint for a fluid conductor system, said rotatable connector consisting of a main joint body, a sealing element and a rotatable joint body, said main joint body including an axial passageway extending therethrough and having two ends, said main joint body including a ring groove spaced from said two ends and forming part of said passageway, said ring groove being positioned adjacent to a radially reduced portion of said passageway, said radially reduced portion being positioned adjacent to a radially widened portion of said passageway, and said rotatable joint body including an axial passageway, said rotatable joint body being fixed to said main joint body and rotatable with respect to said main joint body, said rotatable joint body having a terminal end flared outwardly within said ring groove of said main joint body after insertion of said terminal end into said main body and having a portion of said terminal end defining with said radially widened portion of said main joint body, a cavity for receipt of said sealing element to seal communication through said axial passageway of said main joint body and said axial passageway of said rotatable joint body, an outer diameter of said terminal end being greater than an inner diameter of said radially reduced portion of said main joint body.

2. A rotatable connector joint according to claim 1, wherein said terminal end includes a supporting wall for said sealing element.

3. A rotatable connector joint according to claim 1, wherein said radially reduced portion includes a bevelled edge for engaging said outwardly flared terminal end.

* * * * *